April 21, 1964   HANS-WILHELM BANDE   3,129,581
MATERIAL TESTING PROCESS AND APPARATUS
Filed Feb. 16, 1960   3 Sheets-Sheet 1

INVENTOR.
Hans-Wilhelm Bande
BY
Richard S. Striker

INVENTOR.
Hans-Wilhelm Bande
BY
Michael S. Striker

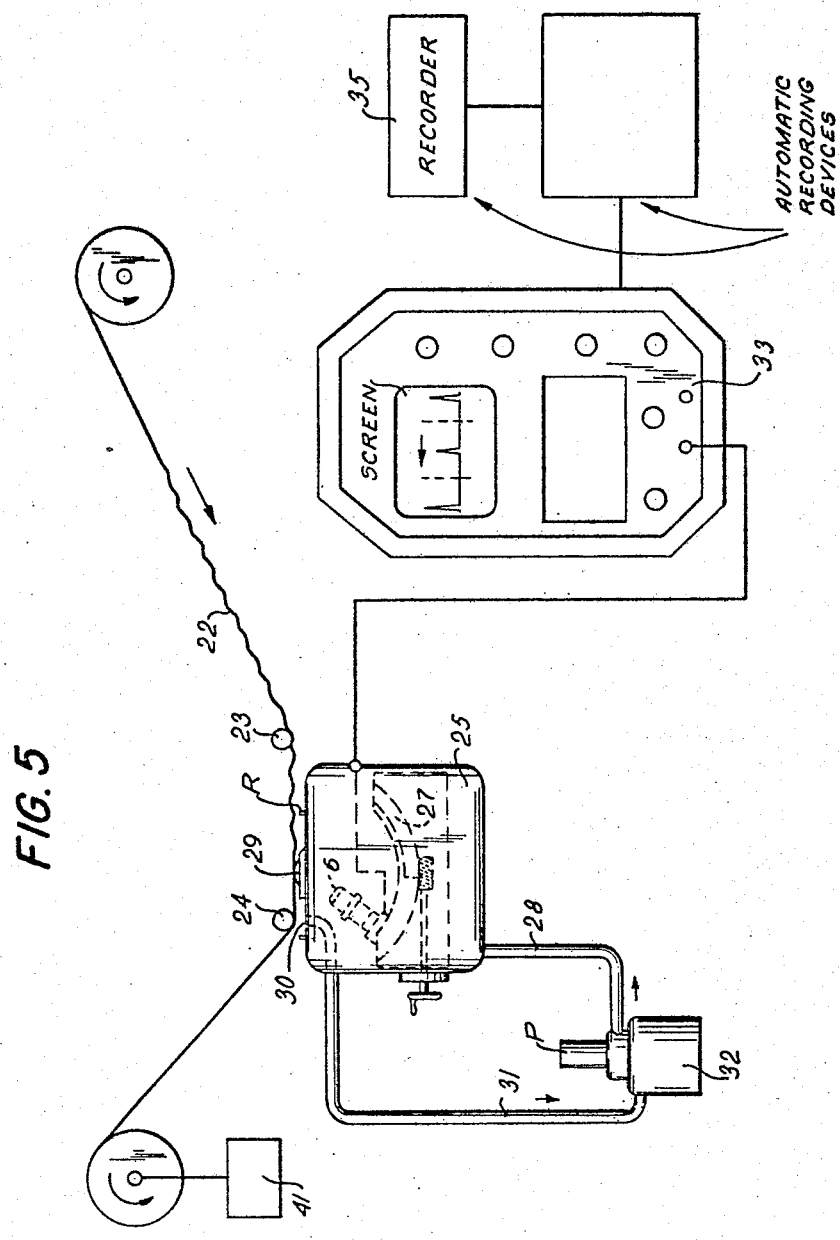

United States Patent Office 3,129,581
Patented Apr. 21, 1964

3,129,581
MATERIAL TESTING PROCESS AND APPARATUS
Hans-Wilhelm Bande, Heppenheim an der Bergstrasse,
Germany, assignor to Dr. Lehfeldt & Co. G.m.b.H.,
Heppenheim an der Bergstrasse, Germany
Filed Feb. 16, 1960, Ser. No. 9,020
Claims priority, application Germany Feb. 17, 1959
12 Claims. (Cl. 73—67.8)

The present invention relates to the testing of pieces such as wires, bars, bands, and the like.

It is known to test such pieces with sound waves derived from electro-acoustic transducers, and in general there are two basic processes for carrying out such tests. In one of these processes the sound waves are transmitted from a sending transducer to the test piece, travel in the test piece, and are then picked up by a second transducer. The other process reflects the sound waves back to the same transducer which sends them to the test piece.

In both of these types of processes material defects such as cavities or cracks in the test piece will be detected. However, it is difficult to obtain with present day methods and apparatus a high degree of accuracy in the testing since false indications of defects are produced by uncontrollable variations in the medium through which the waves travel between the test piece and the transducer or transducers, and in addition false indications of material defects will be produced by roughness in the surface of the test piece.

It is accordingly an object of the present invention to provide a process and apparatus capable of testing pieces of the type referred to above without the possibility of false indications of defects.

Another object of the present invention is to provide a process and apparatus capable of testing pieces while they move continuously at a rapid rate of speed.

Still another object of the present invention is to provide a process and apparatus capable of testing flexible pieces such as wires, bands, and the like, as well as a process and apparatus capable of testing substantially rigid workpieces such as bars, beams, pipes, and the like.

An additional object of the present invention is to provide a process and apparatus capable of testing the test pieces with a preselected type of wave.

With the above objects in view the invention includes, in a process for testing elongated pieces such as wires, bands, bars, and the like, the steps of positioning the piece to be tested so that a part thereof is in contact with a body of liquid, and directing to the piece to be tested ultrasonic waves from an electro-acoustic transducer submerged in the body of liquid to the test piece at a part thereof closely adjacent to the surface of the body of liquid so that the waves will travel through a dry portion of the test piece which is not in the body of liquid.

Also in accordance with the above objects the invention includes, in an apparatus for testing elongated pieces of the type referred to above, a liquid bath and a guide means which guides the test piece along a predetermined path which places the test piece in engagement with the surface of the liquid bath. An electro-acoustic transducer is submerged in the liquid bath adjacent the surface of the liquid, and an adjustable support means supports the transducer in the bath for directing waves from the transducer at a selected angle to the test piece adjacent the surface of the bath.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 shows an embodiment similar to that of FIGS. 2–4 for testing a wire, this figure illustrating additional structure used also with the embodiment of FIGS. 2–4.

The process of the invention makes it possible to detect defects in wires, bars, sheets or bands in an automatic manner according to the impulse-echo method without any variations in the transmission of the waves through the medium between the test piece and the transducer. It is preferred not to impress conventional longitudinal or transverse waves on the test piece. Instead the test pieces are allowed to vibrate at their resonant frequencies so that in the case of sheets and bands these relatively flat structures will vibrate while in the case of wires or bars there will be bending, tensioning, or twisting waves. Waves of this latter type are preferred since they spread through the entire test piece and leave no dead spaces. Also, waves of this type are particularly sensitive and will indicate even small defects in the test piece.

Waves of this type require that the sound waves enter the test piece at an inclined predetermined angle with respect thereto, and it is necessary to provide between the electro-acoustic transducer which may consist of a quartz plate, for example, and the test piece a wedge-shaped medium which carries sound waves at a lower speed than the test piece. Plastic wedges have been used for this purpose, but they present the disadvantage of becoming rapidly worn away when the test piece moves quickly.

A liquid such as water may be used as the wedge medium in order to avoid the disadvantage of rapid wear, but then the above-discussed desirable waves resulting from resonant vibrations cannot be efficiently transmitted to the workpiece since these waves are damped to a high degree by the liquid and thus all of the advantages to be derived from such waves are lost when a liquid is used. According to the invention the advantages of a liquid are retained while still being able to use with full effectiveness the desirable waves resulting from a resonant frequency of vibration of the test pieces. With the process and apparatus of the invention the test piece engages a body of a liquid such as water, and the liquid level is maintained constant in any conventional manner. The single transducer required for testing is submerged in the liquid adjacent the surface thereof, and in accordance with the invention the waves transmitted from the transducer to the test piece encounter the latter as close as possible to the surface of the liquid and the sound waves produced in the test piece in this way move in the latter in countercurrent to the direction of movement of the test piece, which is to say into that portion of the test piece which is still absolutely dry.

Figure 1:
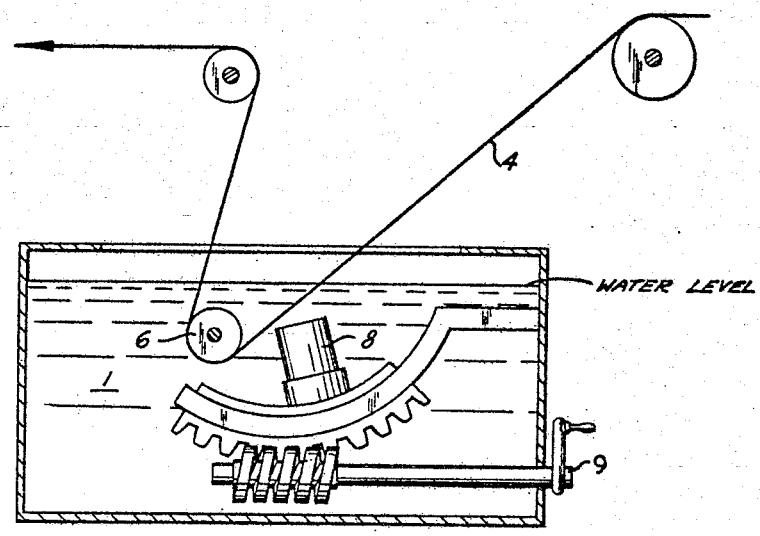
FIGS. 1 to 4 are cross sections diagrammatically illustrating four different embodiments of apparatus according to the present invention capable of carrying out the process of the present invention.

Referring to FIG. 1 it will be seen that the process of the invention illustrated therein is carried out by an apparatus which includes three rollers 6 which guide the test piece 4 at a predetermined angle into the bath 1 which may be water, the test piece 4 moving continuously in the direction of the arrow and being in the illustrated example in the form of a flexible band or wire. The electro-acoustic transducer 8 is submerged in the bath and is situated beneath the moving band 4. The structure of the invention includes an arcuate block which carries the transducer 8 and which is curved along an arc of a predetermined circle, this block being slidable on the arcuate stationary bar shown in FIG. 1 as having the same circular curvature as the block which carries the transducer. A segment of a worm wheel is fixed to the lower portion of the block and meshes with a worm which can be turned manually by the crank 9, so that by turning this crank the angle of the transducer 8 is adjusted. The arcuate guide bar and the opening of the slide block through which it extends are both of non-circular cross section. Thus, in the case of a test piece in the form of a flat band or sheet 4, it is possible by adjusting the angle of the transducer to induce Lamb waves or waves which travel throughout the cross section of the band 4 upwardly to the right along the portion thereof which advances downwardly into the liquid. Reflection of these waves is only possible when they encounter a defect in the material of the test piece. Such a reflected wave travels in a path which is a mirror image of the path of the wave transmitted to the workpiece, and the reflected wave returns to the transducer to be picked up thereby and provide on the registering instrument an indication of a defect.

The accurate positioning of the band 4 as it moves downwardly into the liquid with respect to the transducer 8 is of fundamental importance to carry out the process of the invention.

Of course, the above description holds also for the case where the test piece is a wire instead of a sheet or band.

In the event that a relatively wide band or sheet is to be tested, it is possible to arrange a series of transducers distributed across the band. Moreover, while separate registering instruments may be provided for the separate transducers, it is also possible to connect them in parallel to a single registering instrument, particularly in the case where the particular location of the defect laterally of the band is of no interest. Also, it is possible to support a transducer for oscillatory movement so as to distribute the waves from a single transducer across a relatively wide test piece. In the case where the test piece is in the form of a wire or narrow strip, it is of advantage to place in front of the transducer a frustoconical tube whose smaller end is directed toward the test piece so that even where the diameter of the quartz of the transducer is relatively large, the sound waves issuing therefrom can be concentrated by such a tube onto the relatively small width of the test piece. Such a tube is made of a material which is almost or entirely soundproof so that there will be no lateral straying of sound waves into the liquid bath.

According to the invention it is also of particular advantage to use with test pieces of small width such as wires or narrow bands sound lenses placed between the transducer and the test piece in order to focus the sound waves on the narrow test piece. By suitably shaping such a lens the angle with which the waves travel to the test piece can be very accurately determined.

In order to eliminate undesirable reflection of waves back from the surface of the liquid it is possible to place on the surface of the liquid a layer of a material such as foam rubber which will not conduct sound.

The invention is not limited to the use of the impulse-echo method. For example, the time interval method may be used such as the known process of preferably saw-tooth-shaped frequency modulation. With this method a wave reflected by a defect in the material of the test piece back to the transducer will form as a result of the frequency modulation of the wave being transmitted to the workpiece and instantaneously occurring in the liquid an interference frequency which can be used to indicate a defect in the same way as a reflected wave in the impulse-echo method. The time interval measurement by frequency modulation produces with the process and apparatus of the invention the particular advantage of a variation in the pitch of the interference frequency in dependence upon the distance of the defect, so that such a wave can be very simply separated from waves reflected from a stationary reflecting surface such as, for example, the surface of the liquid. Waves reflected from the latter surface have a constant pitch since the time interval difference remains constant, while the wave reflecting from a true defect in the test piece provides an interference frequency of diminishing pitch.

Of course, all other time interval methods can be used in the same way with the invention. However, the impulse-echo method is preferred since a second transducer serving solely to pick up the waves is unnecessary. Where the waves travel along the interior of the workpiece, a second transducer may be provided positioned properly with respect to the test piece to pick up the waves and register any defects. The increased complexity of the mechanical structure required for such an additional transducer, particularly to adjust the latter accurately with respect to the test piece, is compensated by the simpler electronic system.

It is of course possible to use the structure described above and illustrated in FIG. 1, as well as the above-discussed processes, with non-flexible test pieces, but in this event the bath must be much deeper and the wall of the bath must be provided with a suitable fluid-tight gland through which the test piece can pass to the exterior of the apparatus without any loss of liquid. To avoid these drawbacks it is possible to use the embodiments of FIGS. 2–4 which are particularly suited for testing elongated rigid pieces while they move longitudinally.

Figure 2:
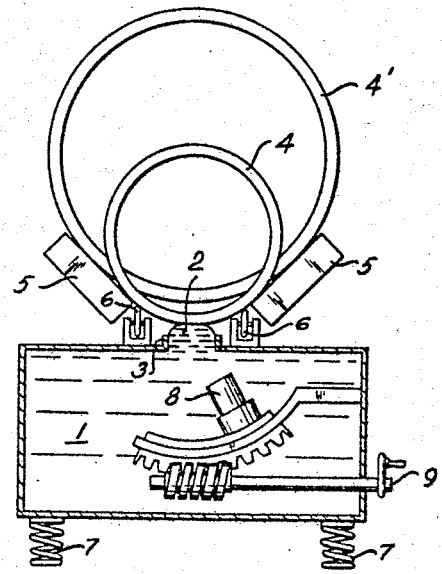
Figure 3:
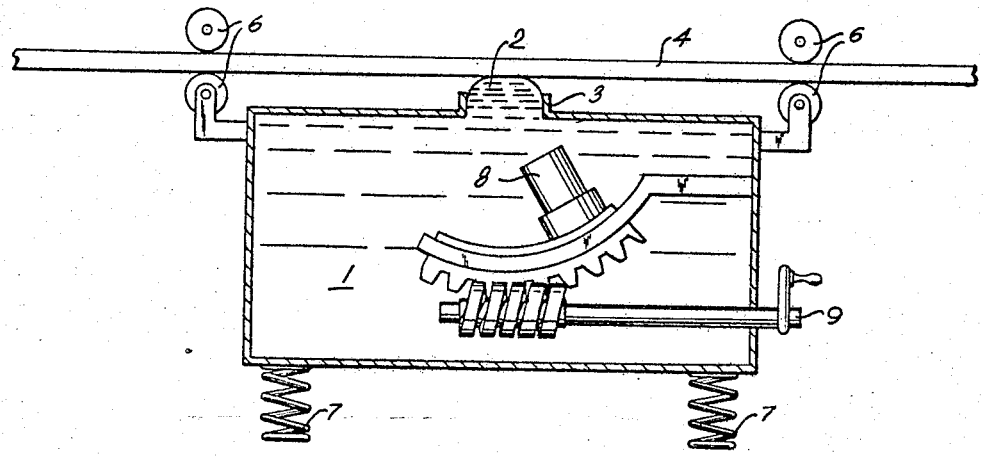
Figure 4:
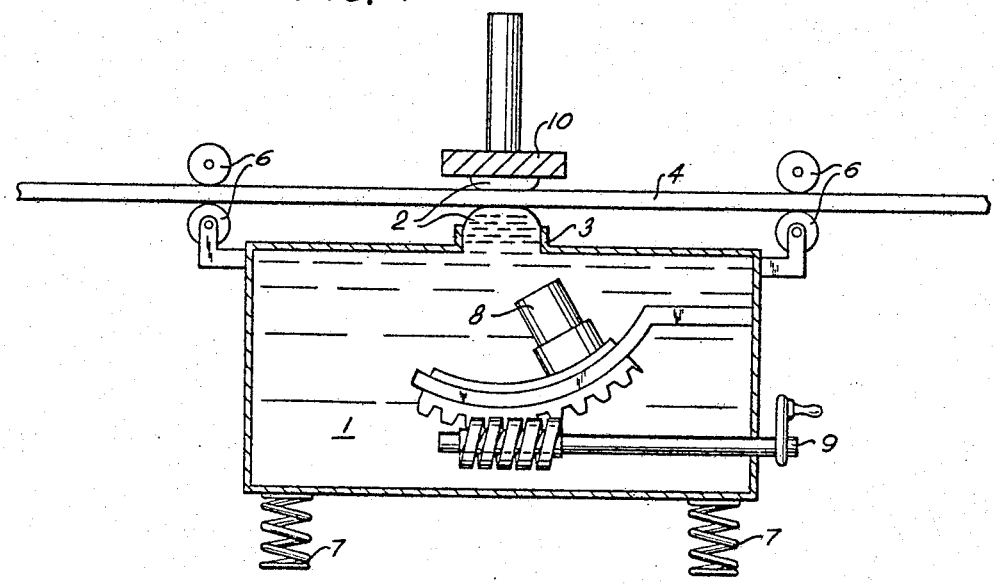

Referring to FIGS. 2–4, it will be seen that the bath 1 has submerged in the liquid therein the same electroacoustic transducer and adjustable support means therefor as described above in connection with FIG. 1. However, the bath 1 includes in FIGS. 2–4 a top wall formed with an opening bounded by a rim 3, and the liquid fills the bath to such an extent that the meniscus of the liquid bounded by the rim 3 provides a curved surface capable of being contacted by the moving test piece. It is preferred, however, to place in communication with the bath 1 a pump which continuously circulates the liquid causing it to over flow the rim 3 and circulate back to the bath 1, so that there is provided a liquid portion 2 having a surface higher than the rim 3 and capable of being engaged by the test piece.

FIG. 2 shows a pipe 4 having its bottom surface in engagement with the liquid portion 2, and the waves are directed to the test piece which is moving longitudinally from the transducer 8 whose angle is adjusted as described above so as to produce the desired waves. Inclined rollers 5 guide the test piece for longitudinal movement and springs 7 urge the entire bath 1 and the structure carried thereby upwardly so as to maintain the liquid portion 2, which continuously overflows the rim 3, constantly in engagement with the test piece. It should be noted that the rollers 5 can remain at a constant angle. If a pipe 4' of a considerably larger diameter is to be tested, the rollers 5 can remain in the position illustrated in FIG. 2, and the springs 7 will simply raise the bath 1 and the structure carried thereby to a higher elevation so as to reliably maintain the liquid in engagement with the test piece 4'. If desired, rollers 6 can be carried by the bath 1 for guiding the test piece. These rollers 6 are displaced along the axis of the test piece with respect to the rollers 5 so that the rollers 6 can move to an elevation higher than the bottom ends of the rollers 5 without engaging the latter.

FIG. 3 shows an arrangement where rollers 6 support a rigid bar 4 for longitudinal movement across and in engagement with the liquid portion 2, so that the test piece 4 can in this case also be tested while moving longitudinally.

FIG. 4 shows a narrow test piece 4 covered by a layer 10 of foam rubber or the like which engages the liquid portion 2 to absorb the latter and provide a film all around the test piece, and as soon as the test piece moves beyond this film of liquid it dries immediately. The layer 10 provides the additional advantage of absorbing any sound waves from the transducer which engage the surface of the liquid laterally of the test piece so as to prevent reflection of such waves from the surface of the liquid back to the transducer. The material of the layer 10 has a sound conductivity which is as close as possible to that of the transmitting liquid.

As was pointed out above all of the testing processes referred to in connection with FIG. 1 can be used in connection with FIGS. 2–4. Thus, a single transducer may be used with the impulse-echo or time interval processes, while a second transducer assembly is used with the process where the waves are picked at a point different from that at which they reach the test piece.

In the event that the impulse-echo process is used, then it is advisable to make the ring 3, particularly at its inner surface, of frustoconical configuration widening in a downward direction so that waves reflected from this inner surface will not be returned directly to the transducer and therefore an interfering reflection of the impulses from the ring 3 is reduced or entirely suppressed.

Referring to FIG. 5, it will be seen that a bath 25 corresponding to the bath 1 of FIGS. 2–4 has in its interior an electro-acoustic transducer 26 identical with the transducer 8 and supported by an adjustable support means 27 identical with the adjustable support means carrying the transducer 8, so that the operator can easily regulate the angle of the submerged transducer 26.

The top wall of the bath 25 is formed with an opening 29 through which liquid flows into an area on the top wall surrounded by the ring R which is fixed to this top wall as by being welded thereto. This top wall is formed with a second opening communicating with a conduit 31, and the liquid which flows over the opening 29 onto the top wall of the bath 25 into the area surrounded by the ring R flows from this latter area into this second opening 30 and downwardly along the conduit 31 which communicates through the opening 30 with the area surrounded by the ring R.

The conduit 31 empties into a reservoir 32, and the suction inlet of a pump P communicates with this reservoir to draw liquid therefrom. This liquid is discharged by the pump P along the pressure discharge conduit 28 into the bath 25, so that in this way the liquid is continuously circulated and maintained in a condition where it continuously overflows the opening 29 into the space surrounded by the ring R.

The test piece 22 shown in FIG. 5 is a wire moving continuously from right to left, as viewed in FIG. 5, through this dome of liquid, so that with this arrangement the liquid forms the medium transmitting the sound waves from the transducer 26 to the test piece at the portion thereof in the liquid dome accessible just over the opening 29, and with the arrangement shown any detected defects are transmitted back to the transducer 26, in the manner described above. A motor 41 drives a pulley onto which the test piece is wound, and guide bars or rollers 23 and 24 indicated diagrammatically guide the wire 22 from its supply spool through the liquid dome to the takeup spool driven by the motor 41. FIG. 5 illustrates the torsion waves moving along the test wire 22 from left to right, as viewed in FIG. 5, in the opposite direction from the movement of the wire itself.

FIG. 5 diagrammatically illustrates the instrument 33 connected to the transducer for receiving indication of defects and showing them on a screen between the pair of dotted lines shown on the instrument 33 in FIG. 5. FIG. 5 also diagrammatically illustrates devices 34 and 35 for automatically recording the results of the test.

It will be understood that each of the elements described above, or two or more together, may also find a useful application in other types of testing differing from the types described above.

While the invention has been illustrated and described as embodied in material testing, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for testing elongated pieces such as wires, bands, bars, and the like, in combination, an enclosure adapted to be filled with a liquid, said enclosure having a top wall formed with an opening having a cross-sectional area adapted to form the liquid in the container into a meniscal bulge extending to an elevation slightly higher than said opening; guide means for guiding the test piece along a path passing through said meniscal bulge so that the test piece engages the liquid at said meniscal bulge thereof; means for supplying into said enclosure at least such a quantity of liquid that a meniscal bulge is maintained in said opening during movement of the test piece; an electro-ascoustic transducer in said container submerged in the liquid adjacent said opening; and adjustable support means supporting the transducer at an angle directing waves from the transducer to said meniscal bulge into contact with the test piece engaging the meniscal bulge.

2. In an apparatus as recited in claim 1, said guide means including rollers respectively having fixed axes of rotation; and spring means urging said container upwardly to maintain said meniscal bulge in engagement with a test piece.

3. In an apparatus as recited in claim 1, said top wall being formed with a second opening; a rim fixed to said top wall at the exterior thereof and surrounding both of said openings; a suction conduit communicating with said second opening; pump means communicating with said suction conduit to draw therethrough liquid overflowing said first-mentioned opening into the area surrounded by said rim and entering through said second opening into said suction conduit; and a pressure discharge conduit communicating with said pump means to receive liquid therefrom and communicating with said container to deliver liquid thereto, so that the liquid is maintained in continuous circulation overflowing said first-mentioned opening during operation of said pump means.

4. In an apparatus as recited in claim 1, circulating means cooperating with said container for circulating liquid from the interior thereof through said opening and back to the interior of said container thereby causing the overflow of liquid through said opening to form said meniscal bulge.

5. In an apparatus for testing elongated test pieces such as wires, bands, bars, and the like, in combination, a liquid bath; enclosure means covering said liquid bath and having an opening formed therethrough, said opening having a cross-sectional area adapted to form the liquid in said bath into a meniscal bulge; guide means for guide a test piece along a predetermined path which places the test piece in engagement with said meniscal bulge; means for supplying into said enclosure at least such a quantity of liquid that a meniscal bulge is maintained in said opening during movement of the test piece; an electroacoustic transducer submerged in the liquid bath adjacent the surface of the liquid; and adjustable support means supporting the transducer in the bath for directing waves from the transducer at a selected angle to the test piece adjacent the surface of the bath, said angle being transverse to the surface of said bath.

6. In an apparatus as recited in claim 5, a layer of liquid absorbing material of substantially the same acoustic conductivity as the liquid; and means positioning said layer of liquid absorbing material over the test piece in engagement with the liquid so as to provide a film of liquid all around the test piece and so as to absorb with the layer of material sound waves which do not reach the test piece and would otherwise be undesirably reflected back into the body of liquid.

7. In an apparatus as recited in claim 5, said support means including a stationary curved bar in said bath extending along an arc of a circle; a curved slide block of the same curvature as said curved bar slidable along the latter and carrying said transducer; a section of a worm wheel of the same curvature as said block fixed to the latter; and a rotary worm screw meshing with said worm wheel so that upon turning of said screw said block will be moved along said bar to adjust the angle of said transducer.

8. In an apparatus for testing test pieces, in combination, a liquid bath; enclosure means containing said liquid bath and having an upper end forming an opening of limited cross sectional area bounded by an edge; means for supplying liquid into said enclosure in such an amount that the liquid in the region of said opening forms an upwardly extending liquid bath portion located above at least part of said edge; guide means for guiding and moving a test piece across said upwardly extending liquid bath portion while in contact with it; an electroacoustic transducer submerged in the liquid bath; and support means supporting said transducer in said bath for directing waves from said transducer toward said opening and said test piece.

9. In an apparatus for testing test pieces, in combination, enclosure means having an upper end forming an opening of limited cross sectional area bounded by an edge; means for supplying liquid into said enclosure in such an amount that the top surface of the liquid forms a meniscal bulge in said opening with the center of the meniscal bulge located above said edge; guide means for guiding and moving a rigid test piece across said meniscal bulge while in contact with said meniscal bulge; and electroacoustic transducer means located in the liquid in said enclosure for directing waves toward said opening and said part of the test piece.

10. In a method of testing a test piece, in combination, the steps of confining the top surface of a liquid in a limited area so that an upwardly projecting meniscal bulge of the liquid forms in said area; positioning a part of a test piece in contact with said meniscal bulge and the remainder of the test piece above said top surface; and directing waves from a part of said liquid located below said top surface toward said meniscal bulge and said part of said test piece so that the waves travel through the liquid, through said part of said test piece, and through another part of the test piece located outside of and spaced from the liquid whereby flaws in said test piece located in said other part thereof can be discovered without immersion of the test piece in the liquid.

11. In a process as recited in claim 10 and wherein the test piece has a small cross sectional area, the steps of maintaining a layer of liquid absorbing material of substantially the same acoustic conductivity as the liquid over the test piece in engagement with the liquid whereby a film of liquid forms all around the test piece, and absorbing with the layer of material sound waves which do not reach the test piece and would otherwise be undesirably reflected back into the body of liquid.

12. In a method of testing a test piece, in combination, the steps of confining the top surface of a liquid in a limited area so that an upwardly projecting meniscal bulge of the liquid forms in said area; guiding a rigid test piece along a predetermined path passing through said bulge so that a part of said test piece is always in contact with said bulge; and directing waves from a part of said liquid located below said top surface toward said meniscal bulge and said part of said test piece so that the waves travel through the liquid, through said part of said test piece, and through another part of the test piece located outside of and spaced from the liquid whereby flaws in said test piece located in said other part thereof can be discovered without immersion of the test piece in the liquid.

References Cited in the file of this patent

UNITED STATES PATENTS

| | | |
|---|---|---|
| 2,378,237 | Morris | June 12, 1945 |
| 2,536,128 | Firestone et al. | Jan. 2, 1951 |
| 2,592,134 | Firestone | Apr. 8, 1952 |
| 2,592,135 | Firestone | Apr. 8, 1952 |
| 2,602,102 | Webb | July 1, 1952 |
| 2,940,305 | Williams et al. | June 14, 1960 |